(12) United States Patent
Park

(10) Patent No.: US 9,025,224 B2
(45) Date of Patent: May 5, 2015

(54) IMAGE-COLOR-CORRECTING METHOD USING A MULTITOUCH SCREEN

(76) Inventor: Won-Ju Park, Incheon (KR)

(*) Notice: Subject to any disclaimer, the term of this patent is extended or adjusted under 35 U.S.C. 154(b) by 415 days.

(21) Appl. No.: 13/519,389

(22) PCT Filed: Dec. 24, 2010

(86) PCT No.: PCT/KR2010/009302
§ 371 (c)(1),
(2), (4) Date: Dec. 7, 2012

(87) PCT Pub. No.: WO2011/081362
PCT Pub. Date: Jul. 7, 2011

(65) Prior Publication Data
US 2013/0082946 A1    Apr. 4, 2013

(30) Foreign Application Priority Data
Dec. 28, 2009  (KR) .................. 10-2009-0131544

(51) Int. Cl.
| | |
|---|---|
| *G03F 3/08* | (2006.01) |
| *G09G 5/02* | (2006.01) |
| *G06F 3/0484* | (2013.01) |
| *G06F 3/0488* | (2013.01) |
| *H04N 1/46* | (2006.01) |
| *G06F 3/041* | (2006.01) |

(52) U.S. Cl.
CPC .............. *G09G 5/02* (2013.01); *G06F 3/04847* (2013.01); *G06F 3/04883* (2013.01); *G06F 2203/04808* (2013.01); *H04N 1/46* (2013.01); *G06F 3/041* (2013.01)

(58) Field of Classification Search
USPC .................... 358/1.9, 2.1, 518, 520; 382/167; 345/173
See application file for complete search history.

(56) References Cited

U.S. PATENT DOCUMENTS

| | | | | |
|---|---|---|---|---|
| 5,825,352 | A * | 10/1998 | Bisset et al. .................. | 345/173 |
| 2002/0191007 | A1 | 12/2002 | Fujii | |
| 2009/0201367 | A1 | 8/2009 | Pines et al. | |
| 2011/0164029 | A1* | 7/2011 | King et al. ..................... | 345/419 |
| 2013/0132903 | A1* | 5/2013 | Krishnaswamy ............. | 715/825 |

FOREIGN PATENT DOCUMENTS

| | | |
|---|---|---|
| JP | 05-300531 | 11/1993 |
| JP | 2004-210216 | 7/2004 |

* cited by examiner

*Primary Examiner* — Jamares Q Washington
(74) *Attorney, Agent, or Firm* — Antonio Ha & U.S. Patent, LLC

(57) ABSTRACT

A method for correcting the color of an image using a multi-touch capable touch-screen of a digital device used for photo or video equipment. The method turns away from the traditional three ways color correction systems or slide system used for conventional color correction control device by effectively using movements of hands and the line of them. Accordingly, the number of controls for color correction of images may be reduced.

16 Claims, 23 Drawing Sheets

FIG.7
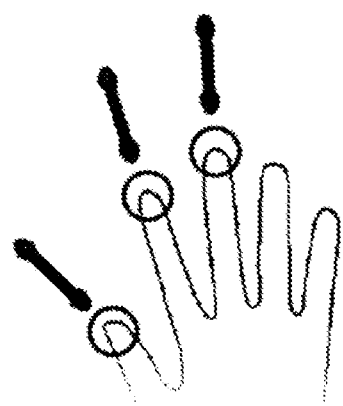
FOLD / UNFOLD
SIZE OF AREA

FIG.8
ROTATE 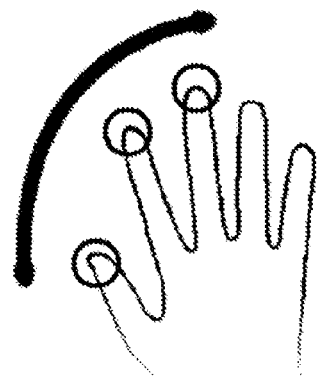  AVERAGE ROTATION VALUE 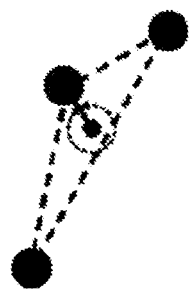

FIG.15
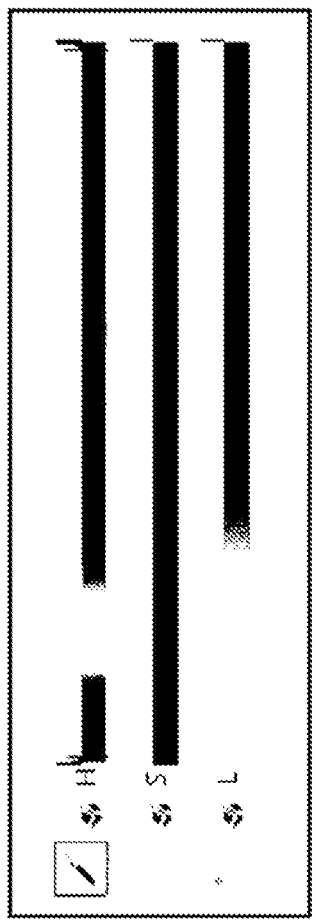
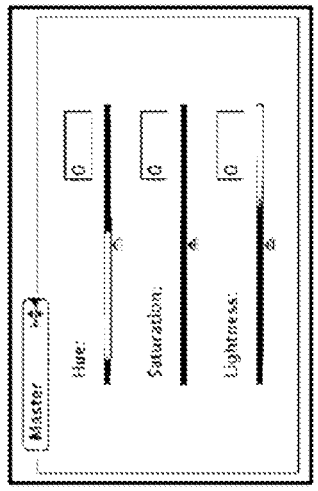

FIG.22

|  | HSL Mode | | | RGB Mode | | | BGC Mode | | |
| --- | --- | --- | --- | --- | --- | --- | --- | --- | --- |
|  | Hue | Saturation | Lightness | Red | Green | Blue | Brightness | Gamma | Contrast |
| Master | O | O | O | O | O | O | O | O | O |
| Shadow | O | O | O | O | O | O | O | O | O |
| Mid-Tone | O | O | O | O | O | O | O | O | O |
| Highlight | O | O | O | O | O | O | O | O | O |

FIG.23

|  | HSL Mode ||| RGB Mode ||| BGC Mode |||
|---|---|---|---|---|---|---|---|---|---|
|  | Hue | Saturation | Lightness | Red | Green | Blue | Brightness | Gamma | Contrast |
| Master | 1,2 Multi-touch method | 1,2 Multi-touch method | 1,2 Multi-touch method | 1,2 Multi-touch method | 1,2 Multi-touch method | 1,2 Multi-touch method | 3 Multi-touch method | 3 Multi-touch method | 3 Multi-touch method |
| Shadow | Move + Weight Center | Fold / Unfold ÷ Area | Rotate + Average Rotation Value | No.1 Finger Fold / Unfold ÷ Weight Center | No.2 Finger Fold / Unfold ÷ Weight Center | No.3 Finger Fold / Unfold ÷ Weight Center | No.2 Finger Fold / Unfold ÷ Weight Center | No.3 Finger Fold / Unfold ÷ Weight Center | No.4 Finger Fold / Unfold ÷ Weight Center |
| Mid-Tone ||||||||||
| Highlight ||||||||||

IMAGE-COLOR-CORRECTING METHOD USING A MULTITOUCH SCREEN

TECHNICAL FIELD

The present invention is related to a method for color correction of images in digital device. More particularly, the present invention is related to a method for correcting color of image using multi-touch capable touch-screen of digital device used for photo or video equipment, that is, a method for correcting color of image using multi-touch capable touch-screen, turning away from the traditional 3 ways color correction systems or slide system used for conventional color correction control device, by effectively using movements of hands and the line of them, is capable of reducing the number of controls for color correction of images. In addition, the present invention is related to a method for correcting color of image using multi-touch capable touch-screen that is implemented as user-oriented interface, which makes it possible to intuitively control the color correction of images and determine the results.

BACKGROUND ART

There have been three major color correction methods. They are HSL method, RGB method, and BGC method.

Firstly, HSL method is a color correction method that is based on three properties of a color, Hue (H), Saturation (S) and Lightness (L), which corrects colors by interpreting them respectively.

Secondly, RGB method is a color correction method that was developed based on color space with color information, which is a method of controlling Red (R), Green (G), and Blue (B) independently.

Lastly, BGC method is a traditional color correction method that has been used for controlling color in TV CRT. It corrects colors by using Brightness (B), Gamma (G), and Contrast (C), which makes it possible for the user to control the color of CRT easily by referring to the meaning of the terms.

Referring to FIG. 21, explaining the BGC method in detail, BGC respectively stands for Brightness—Gamma—Contrast. That is, traditional method for controlling colors of TV CRT by which controls the dark-tone area, mid-tone area, and highlight area. It is a method by which controls the color in accordance of the ranges of tones. RGB Method can be explained as variation in axis of color space, which makes it different from BGC method. RGB Method can be explained as variation of value in space and BGC method as variation on a line.

Referring to FIG. 21, the difference between the two methods comes from the variation on a line, which is a diagonal line which appears on the right of the picture. The picture on the right side is a curve showing the input/output relation of histogram. The detailed explanation about histogram will be given in the later part of this specification.

In the input on X axis and output on Y axis, it becomes darker on left and down. Since it shows the input/output relation in gray gradation tone, it becomes a line. Consequently, input/output relation that depicted as diagonal line can be controlled to vary the output in relation to input so that color can be controlled. As mentioned, in accordance with the tone range, the shape of the diagonal line is controlled by using Brightness—Gamma—Contrast buttons, of which the functions are shown in FIG. 21.

Shape of the curve can be freely controlled by using B, G, and C buttons respectively in combined way. Consequently, users can control the relation of input and output to desired shape. First, controlling the Brightness will affect the entire output for input. And, by controlling the Gamma the shape of diagonal line will be controlled to be inflated shape to the upper or downward direction and intermediate brightness area can be controlled. Finally, controlling the Contrast will affect only the bright area. Consequently, Gamma controls intermediate brightness area, Contrast controls bright area and Brightness controls the entire area. However, even thought controlling the Brightness affects entire area, there are separate functions of controlling the other two areas, and it is used to affect only the dark area. In conclusion, BGC method can be understand as a method that induce relative change of the output to the input by varying the shape of the line representing the input and output relation.

In addition, for precise color correction, in traditional color correction method, it is divided into to Shadow (S), Mid-Tone (M) and Highlight (H) to control the areas respectively. In case that area to be corrected is not selected in accordance with the lightness, automatically entire areas (Master, M) can be applied.

Since Human visual perception does not respond each area evenly, it is more efficient to control the areas one by one in accordance with the lightness in the aspect of color correction. In this sense, color correction based on the respective area can be said to be necessary. Above mentioned can be summarized as shown in the table of FIG. 22.

On the other hand, advances in computer technology led to many changes in aspects of color correction of photographs and images. First, environment has been provided in which methods mentioned above can be used in a variety by a combination of a variety of ways in the actual computer environment. The environment was provided in which users can freely select any way, which is the way based on the properties of colors, the way to reproduce colors on a monitor, and the traditional way of CRT TV.

However, since the color reproduction in the computer environment was developed with a mouse-interface, the way of controlling the color correction has naturally devolved to limited to the principles and way to use the mouse.

Today, due to technological advances of new input devices, paradigm shift of the color correction interface that was used in the existing computer environment is required. In other words, the age of a paradigm shift has come from the mouse-way using the 'one-click' way to the 'multi-touch' way with a multiple input.

In this digital environment, there have been conventional color correction methods for images (photos and videos) and the following user interfaces. They are SLIDE BARS UI method, COLOR WHEELS UI method, COLOR PICKER UI method, CURVE UI method.

The above conventional color correction methods for images and the following user interfaces will be described with reference to the accompanying drawings.

SLIDE BARS UI Method

The SLIDE BARS UI method is a typical user interfaces method that has been used for correcting color of images and photos in a digital environment. As shown in FIG. 15, each slide-bar that work independently is adjusted to adjust Color (Hue), Saturation, and Brightness (Lightness) of HSL-way. At least three movements are needed to adjust the color on the actual operation. Also, it is inconvenient to verify the change of images (photos, video) comparing the degree adjusted by actual mouse with displayed images (photos, video).

COLOR WHEELS UI Method

COLOR WHEELS UI method is a method using a vector. Value of the vector is determined by the direction and distance thereof. In this method, the reference point which is the initial value of the color wheel is moved to a specific location, thus direction and distance thereof is changed, and the value of newly changed colors is created.

The property of colors is controlled through the color wheel, the color (Hue) is determined by the moving direction, and the Saturation is determined by the moved distance. FIG. 16 illustrates a typical color wheel. The figure on the left shows the appearance of the initial value before its change and the figure on the right shows the appearance in case of moving the center point to change colors and saturations.

In this method, although it is possible to adjust the two properties (color (hue) and saturation) through one movement, it is not possible to adjust the three properties (color (hue), saturation, and brightness) which are needed to adjusted to correct colors all at once.

There are all three properties of the color, thus another movement is required for remaining one element. In other words, there is a problem that the vertical bar on the screen on the most right side representing the brightness still did not change and vertical bars is controlled by separate actions. FIG. 16 shows that the vertical bar on the screen on the most right side representing the brightness still does not change.

COLOR PICKER UI Method

Referring to FIG. 17, COLOR PICKER UI method is a method for picking colors. In the other words, users select the wanted color directly on the screen in this method. For more sophisticated color choices, it is possible to input detailed values with numerical values.

The function of the COLOR PICKER UI method is different from that of the method described above, and it is similar to the function for selecting a color when users draw a picture rather than the function for regulating the color. Therefore, it is not frequently used in color correction tools for actual images.

One of the advantages of the color picker is that can be used by changing several modes. In FIG. 17 of the right-hand side of the screen, several radio buttons that looks like go-stone are shown, and these buttons have the function mentioned above. For example, when the user want to select a way (function) relating the color (Hue) in the color properties, it is possible to select the radio button 'H'. Then, the color picker window of the square shape in the left side is changed to a color mode. Explaining the method for selecting in detail, the radio button 'H' (Hue, color) is selected, and the window is changed to the color mode. Then, a vertical bar located in the middle of the screen is adjusted to select desired colors in the color spectrum. Therefore, the corresponding color is displayed on the left side of the screen and the desired saturation (S) and brightness (L) of the color can be selected by clicking them on the screen. The corresponding saturation (S) and brightness (L) is selected based on the color.

Referring to FIG. 17 at the upper side, RGB, CMYK, or Lab select buttons in addition to H, S and B appear among radio buttons at the right side. Described through the following Figure, each concept is more easily understood. For example of a typical RGB color space, more related content will be described in detail. FIG. 17 at the bottom side shows the RGB color space. In the digital environment, all colors is reproduced by numerical values, and these numerical values will have a range of three-dimensional space, such as the FIG. 18.

Each of RGB or Lab will form three-dimensional space with axis of each of R, G and B or L, a, and b. The colors of the photos or images in this space will exist with one color coordinate value. In the Color Picker method, one of the radio buttons represent one axis, it is able to adjust other factors based on the axis. Thus, 3D three-dimensional color space is used in the space of a 2D two-dimensional plane.

However, in the color picker method, it is necessary to select a wanted color every time, and then re-adjust its value. This method is not different from the above mentioned method in that the user clicks multiple times and seeks the corrected color, and has the same problem.

4. CURVE UI Method

CURVE UI method is not naturally made for the purpose of color correction. When the first TV CRT was invented, it has a problem of a poor quality. Thus, this function was provided in order to encourage a better quality for users to adjust the screen to suit their environment.

The concept of the curve is easily explained through FIG. 19. One of the images reproduced on a computer monitor as well as a TV CRT appears as shown in FIG. 19.

However, all CURVE UI methods need several points added for the fine-tuning of colors. Thus, in the end, it is necessary to click multiple times for adjustment in common with above-mentioned methods in terms of the user interface. A black image that looks like ridge will show in the middle of FIG. 19. This is the classified amount of physical data recorded on one image according to the brightness.

The concept is a little difficult to understand. For examples, try to imagine one black-and-white photo recorded as a file on your computer. The bright, dark and mid-tone areas of the black-and-white photo existed as files are recorded as digital numerical value. In the photo, the darkest area has a value of 0, the brightest area has a value of 255, and the mid-tone area has a value of roughly 127.

It does not matter whether the value itself is high or low. The brightness thereof is regulated as a numerical value (in case of 8-bit images) merely. Thus, the brightness information of the photo is displayed as black-and-white tone from the left side with zero (0) to the right side with 255.

The each brightness information of a photo image exists as a pixel, and the total amount of the distribution thereof is displayed by the bar graph according to the already qualified gradation (tone, brightness) from 0 to 255. As a result, because the vertical Y-axis on the screen represents the total sum of pixels with the same brightness distributed in one image and the horizontal X-axis represents defined brightness levels, the bar graph appears continuously.

In case of color photos, the three R, G, B channels are displayed as each with a gray tone, they are shown overlapped with each other on the one united screen. So, it becomes the same type of FIG. 19, same as a single channel of the black-and-white photo. The one displayed in this way is generally referred to as 'histogram' in a technical term.

The reason describing histogram is that the curve method is a method to correct the color by the amount of the distribution in brightness (tone) of each pixel indicated in the histogram. In other words, it is a method to display the amount of physical information of the histogram as output relationship to input. The X-axis of the curve is a input histogram information, and the Y-axis of the curve is a output histogram information. The color correction by the curve is a method to change this relationship.

FIG. 19 shows the typical appearance of the curve method. Bars with gray tone can be seen at the side of X-axis and Y-axis. As discussed above, because the X-axis is a input histogram information and the Y-axis is a output information, each axis shows with gray tone.

Because the curve method is same as that of histogram, the left area is dark and the area becomes brighter going toward the right side. Also the left side of FIG. 19 shows a one-to-one linear relationship of the input and output. In the right side of FIG. 19, the output information to the input changes. When the control points as shown in FIG. 19 are added, the relationship is able to change. In the curve method, there is a curve method to adjust the curve as a horizontal line as shown below in FIG. 20 as well as a diagonal line.

Likewise, the conventional color correction methods or interfaces were guaranteed for the accuracy and precision because they are used for a long period of time.

However, it is difficult to perform the method with the high accuracy and precision because the modern computer becomes smaller and lighter.

Instead, in a small display screen being easy to carry, the traditional color correction method used to improve the accuracy and precision can be more uncomfortable. Of course, differently from the method that was based on single touch with the click of a mouse, today's many devices are made for multi-touch recognition. These changes strengthen its inHuence rapidly like trends. In other words, the new age of a paradigm shift for the input device has come.

Thus, unlike the conventional method based on the single touch of keypad or touch-pad, there is a strong demand for the development of a new color correction methods or interfaces which can reduce unnecessary repetition of user's movements and enable color correction using user's intuition and one continuous movement in a device based on multi-touch function.

DISCLOSURE

Technical Problem

To overcome the above problems, it is therefore an object of the present invention to provide a color correction method with a new concept which can reduce unnecessary repetition of user's movements and enable color correction using user's intuition and one continuous movement in a device based on multi-touch function.

Technical Solution

To achieve the above objects, according to an aspect, the present invention provides a method for correcting color of image using multi-touch capable touch-screen, the method comprising, sensing touch of 3 fingers on the surface of the touch panel, detecting each finger's input coordinate for each finger's position and setting the input coordinates of 3 fingers into the first set of coordinates; calculating the first center coordinate of the first triangle formed by the first set of coordinates; detecting each finger's changed input coordinate for each finger's changed position and setting the changed input coordinates of 3 fingers into the second set of coordinates, according to the movement of the each finger on the touch panel; calculating the second center coordinate of the second triangle formed by the second set of coordinates; calculating the center deviation distance between the first center coordinate and the second center coordinate; calculating triangle area size ratio between the area of first triangle formed by the first set of coordinates and the area of the second triangle formed by the second set of coordinates; and calculating average rotation value between the first triangle formed by the first set of coordinates and the second triangle formed by the second set of coordinates, wherein, Hue, Saturation and Lightness of the image is altered based on the center deviation distance, the triangle area size ratio and average rotation value.

According to another aspect, the present invention provides a method for correcting color of image using multi-touch capable touch-screen, the method comprising: sensing touch of 3 fingers on the surface of the touch panel, detecting each finger's input coordinate for each finger's position and setting the input coordinates of 3 fingers into the first set of coordinates; calculating the first center coordinate of the first triangle formed by the first set of coordinates; detecting each finger's changed input coordinate for each finger's changed position and setting the changed input coordinates of 3 fingers into the second set of coordinates, according to the movement of the each finger on the touch panel; calculating the second center coordinate of the second triangle formed by the second set of coordinates; calculating the first set of distances from the first center coordinate to the first set of coordinates, and calculating the second set of distances from the second center coordinate to the second set of coordinates, wherein, RED, GREEN and BLUE of the image are altered in proportion to distance length ratios of the second set of distances to the first set of distances.

According to the other aspect, the present invention provides a method for correcting color of image using multi-touch capable touch-screen, the method comprising: sensing touch of 3 fingers on the surface of the touch panel, detecting each finger's input coordinate for each finger's position and setting the input coordinates of 3 fingers into the first set of coordinates; calculating the first center coordinate of the first triangle formed by the first set of coordinates; detecting each finger's changed input coordinate for each finger's changed position and setting the changed input coordinates of 3 fingers into the second set of coordinates, according to the movement of the each finger on the touch panel; calculating the second center coordinate of the second triangle formed by the second set of coordinates; calculating the first set of vertical distances that are vertical component distances of the first set of distances from the first center coordinate to the first set of coordinates and the second set of vertical distances that are vertical component distances of the second set of distances from the second center coordinate to the second set of coordinates, wherein, values of Brightness, Gamma, and Contrast of the image are altered in proportion to the 3 distance length ratios of the second set of distances to the first set of distances

Advantageous Effects

According to the present invention of a method for correcting color of image using multi-touch capable touch-screen, first, the color correction is possible with just a single movement, which has been done by individual control of each control device in repeated way. Second, it is possible for the line of hand's movement which causes relatively large movement to have maximum efficiency in time and space. Third, the previous process of monitoring image and control device alternately can be reduced to a process of only monitoring the monitor on which the effect of color correction is applied. Consequently, effect and possibility of further development can be maximized by use of fingers of both hands since it is possible to realize an intuitive interface.

Specifically, According to the present invention, in a device based on multi-touch, color correction can be performed more easily since it is possible to change Hue value, Saturation value and brightness value of images by user's intuition and one continuous movement while reducing unnecessary repetition of user's unnecessary movements. And therefore, it is possible to realize various user interfaces for color correction used therefor in multi-touch capable touch-screen.

According to the present invention of another aspect, in a device based on multi-touch, color correction can be done more easily since it is possible to change Red value, Green value and Blue value of images by user's intuition and one continuous movement while reducing unnecessary repetition of user's unnecessary movements. And therefore, it is possible to realize various user interfaces for color correction used therefor in multi-touch capable touch-screen.

According to the present invention of the other aspect, in a device based on multi-touch, color correction can be performed more easily since it is possible to change Brightness value, Gamma value and Contrast value of images by user's intuition and one continuous movement while reducing unnecessary repetition of user's unnecessary movements. And therefore, it is possible to realize various user interfaces for color correction used therefor in multi-touch capable touch-screen.

Further, according to the present invention, in a device based on multi-touch, at least one of color correction by changing Hue value, Saturation value and brightness value, color correction by changing Red value, Green value and Blue value, color correction changing Brightness value, Gamma value and Contrast value can be performed as various color correction methods of using user's intuition and one continuous movement while reducing unnecessary repetition of user's unnecessary movements. And therefore, more precise color corrections become possible and it is possible to realize various user interfaces for color correction used for it in multi-touch capable touch-screen.

Furthermore, according to the present invention, using coordinates of 3 fingers' positions, various variables used for color correction can be produced by one movement. And therefore, it is possible to realize various types of color correction tools, which includes types that at least two of HSL method, RGB method, and BGC method are combined, types that one of the methods is partially combined to another method, and so on.

DESCRIPTION OF DRAWINGS

FIG. 5 to FIG. 8 are figures for explaining an embodiment when color correction methods of image according to an embodiment of the present invention are applied to the HSL method.

FIG. 15 to FIG. 21 are figures for explaining background arts of the present invention. FIG. 22 is a view illustrating a table for describing the need of color correction. FIG. 23 is a view illustrating a table for describing an example according to embodiments of the present invention.

MODE FOR INVENTION

Hereinafter, preferred embodiments of the present invention will be described in detail with reference to the accompanying drawings.

FIG. 1 to FIG. 4 are figures for explaining basic concepts of color correction methods of image using multi-touch capable touch-screen according to the present invention.

The present invention adopts Multi-Touch Methods as the first basic concept of a color correction method of image using multi-touch capable touch-screen.

Figure 1:
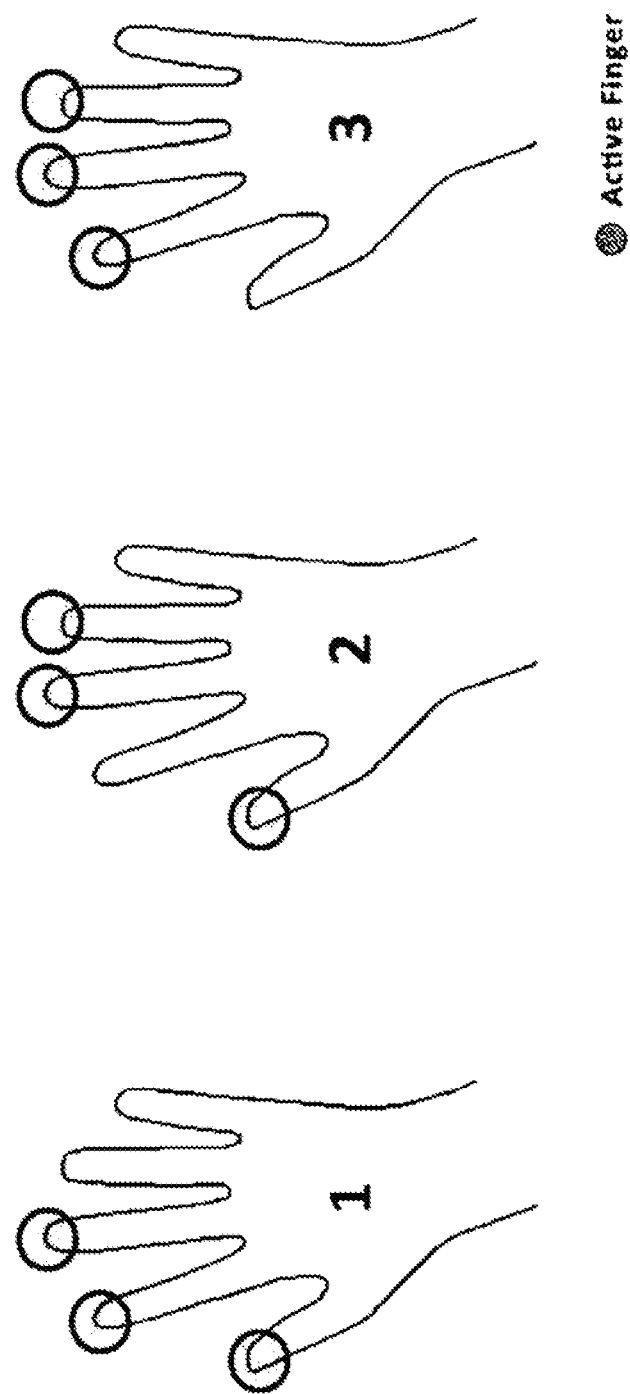
FIG. 1 and FIG. 2 are figures for explaining basic concepts of color correction methods of image using multi-touch capable touch-screen according to the present invention.
Figure 2:
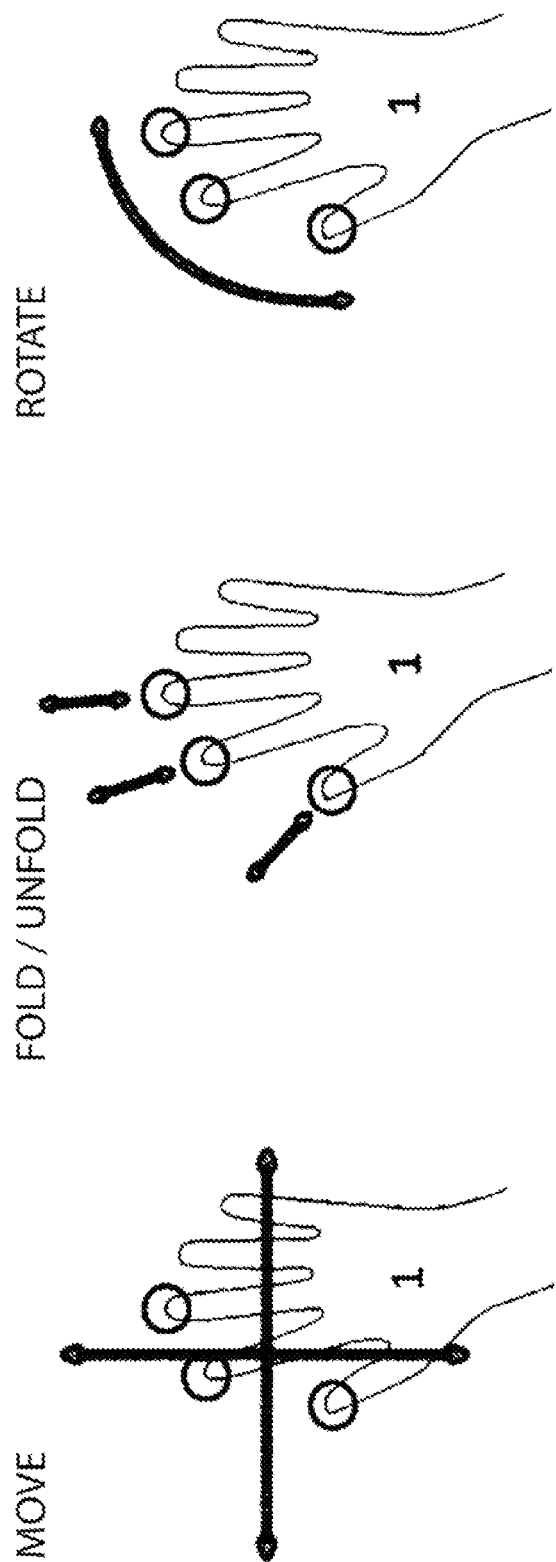
Figure 3:
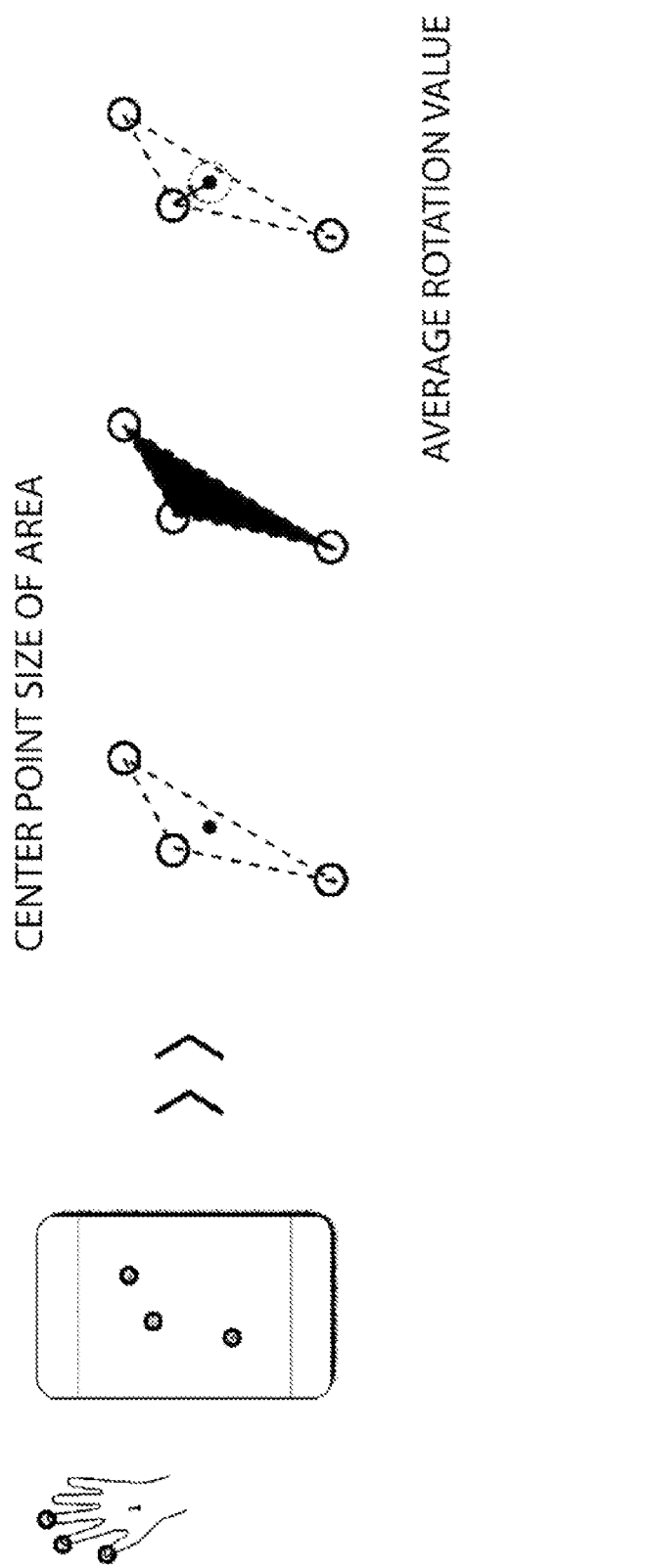
FIG. 3 is figure for explaining basic concept of color correction methods of image according to an embodiment of the present invention.

Referring to FIG. 1 and FIG. 2, as a multi-touch method, a color correction method of the present invention is a method for "performing a color correction at one time using 3 fingers", while only one factor is controlled at a time for color correction of photo or image in traditional color correction method. The usage 1, 2, and 3 presented in FIG. 1, FIG. 2 and FIG. 3, are not showing performing different functions but listing possible set of fingers can be used for using the control device for color corrections. Accordingly, using fingers as presented is not the main point, the point that using 3 fingers is more important. In performing the color correction using fingers, introducing the concept that 3 fingers of one hand or both hands can be used for multi-touch in accordance with user's preference and effect color correction by one movement of hand can be achieved is important.

Benefits that users will obtain by using such multi-touch method are as followed.

First of all, the color correction becomes possible by a single movement of each control device which was individually controlled by repeatedly circulating color corrections Second, the maximum temporal and spatial efficiency is guaranteed by changing the method with the relatively big motion in moving line into the method for using multiple fingers of the hand.

Third, it is possible for intuitive interface type to implement with rapidly reducing process by changing the process of verifying the control device and the image for the color correction into the process of verifying the effect through a monitor.

Finally, it is possible to maximize the effectiveness and possibility of development by using the fingers of both hands.

The present invention adopts Natural Hand Methods as another basic concept of a color correction method of image using multi-touch capable touch-screen.

Figure 4:
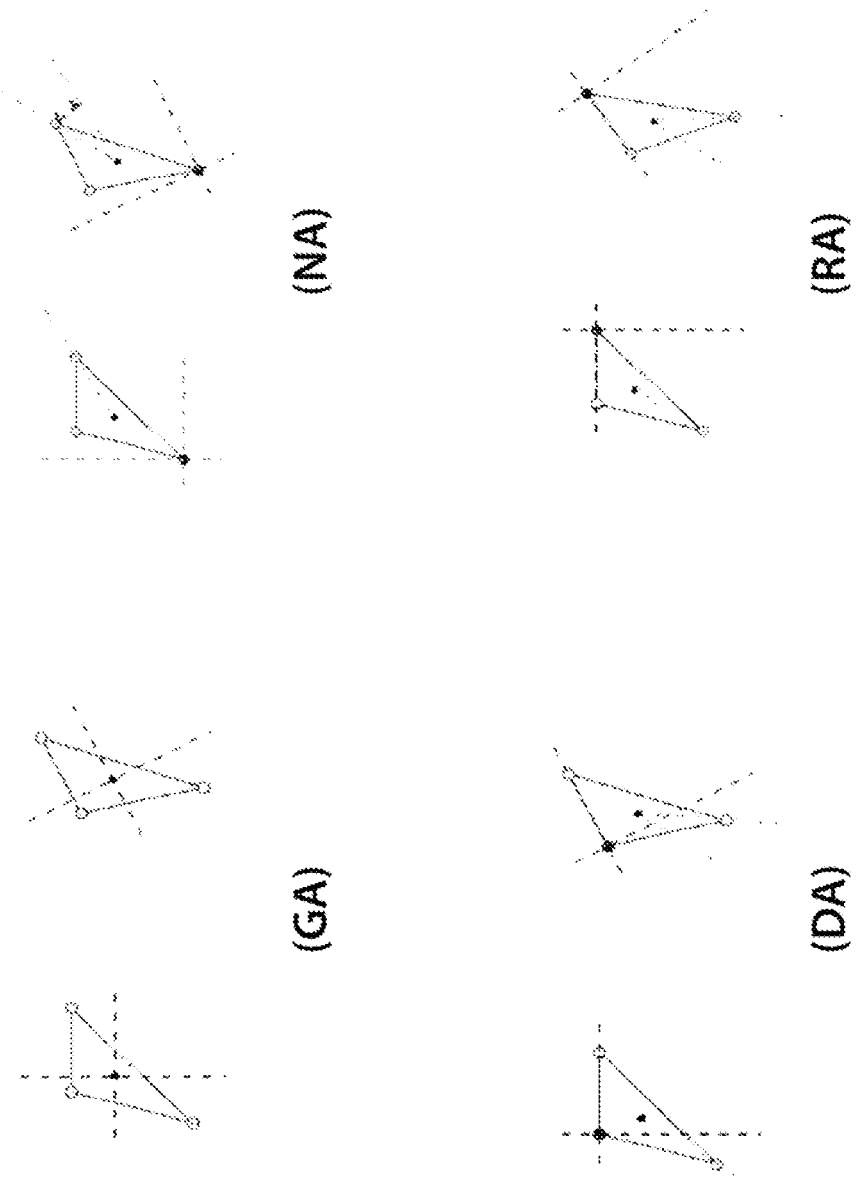
FIG. 4 is figure for explaining exemplary method for calculating average rotation value in the method according to an embodiment of the present invention.

Referring to FIG. 3 and FIG. 4, the previously described multi-touch method performs the functions required for the color correction through the movement of the same way as FIG. 3 and FIG. 4. Here, explanations about primarily available movements are as followed. Even if the method is to measure the variation of the information that is entered through the fingers, it is not simply use the fingers but use the movements of the whole hand, this method is called "natural hand method" for convenience.

The movement of hands or fingers in case of using the natural hand method of the present invention to perform the function of color correction is shown as FIG. 3 and FIG. 4.

First, the movement of hands or fingers is explained through the first case (1) of the three methods described in the multi-touch method. The moving methods of the second (2) and third (3) case are not different from that of the first case (1). The natural hand method is roughly explained by the three kinds of movements. They are Movement, Contraction/Expansion (Fold/Unfold), and Rotation.

First, the Movement is that the whole hand moves while the 3-finger touching the screen does not independently move. Second, the Contraction/Expansion (Fold/Unfold) is that three fingers used for touching are contracted inward or expanded outward palm.

Third, the Rotation is that three fingers are placed on the touch screen, moved in a circular motion to rotate the wrist.

For reference, the finely moving the finger on the touch in Movement or Rotation may be concerned about. However, the error on the fine 3-finger movement does not affect the performance of all functions for color correction, because standard numerical values and calculation methods for each action are applied differently.

Referring to FIG. 3 to FIG. 14, the embodiments of the method for correcting color of image using multi-touch capable touch-screen according to the present invention based on the principle of color correction of the multi-touch method and natural hand method are specifically explained.

As mentioned above, there have been conventional methods for color correction, such as HSL method using three properties of a color, RGB method using three-dimensional color space, and BGC method considering properties of input/output. The fundamental elements in each method required for color correction does not change, even if any multi-touch color correction method is applied.

FIG. 3 is figure for explaining basic concept of color correction methods of image according to an embodiment of the present invention.

In above-mentioned Multi-Touch Methods and Natural Hand Methods which are basic concepts of the present invention, information on the position of 3 fingers on the touch panel inputted into through multi-touch is used. Basic concepts that color correction is performed based on the change of information on the position of 3 fingers which is inputted according to the movement of fingers on the touch panel can be realized as various type of embodiment.

Referring to FIG. 3 and FIG. 4, the concept is that color correction is performed by modifying or correcting values of color characteristics, using the information obtained from the positional changes of 3 fingers (that is, triangle formed by coordinates, the triangle's center points which are preset or calculated and are on inside or outside of triangle, area and calculated average rotation value, and changes thereof) as variables for color correction (that is, color correction variables).

In other words, based on the set of three coordinates which input coordinates for each finger detected for 3 fingers' positions changing in accordance with the fingers' movements on the surface of the touch panel are set into, they are realized as the type performing color correction by changing values of Hue, Saturation, and Lightness, Red, Green, and Blue, or Brightness, Gamma, and Contrast of images, which are color characteristics of image for which variables for color corrections are pre-assigned. The triangles are formed by the three coordinates which varies according to the fingers' movement, and center points on internal or outer of the triangle changes, from the varying coordinates and center points, distance between center points (center deviation distance), area size ratio between triangles (triangle area size ratio), average rotation value between triangles (average rotation value), ratios of changes in distances from center coordinate to the three coordinates for each finger (distance length ratios), and ratios of changes in vertical or horizontal componential distances from center coordinate to the three coordinates for each finger (vertical distance length ratios or horizontal distance length ratios) can be calculated as the variables for color correction.

The acquisition method and calculation method of information used in an embodiment of the present invention and embodiment is explained with denotations on drawings.

The set of coordinates Pn which is acquired by setting each finger's input coordinates detected for 3 fingers' positions on the surface of the touch panel into it, comprises 3 coordinates on a plane denoted as $(X1n, Y1n)$, $(X2n, Y2n)$, $(X3n, Y3n)$. They are varying in accordance with each finger's movement, where 1, 2, 3 identify 3 fingers and n represents that they are the coordinates which has been changed n times in accordance with each finger's movement.

Initial set of coordinates P0 comprises 3 coordinates on a plane denoted as $(X10, Y10)$, $(X20, Y20)$, $(X30, Y30)$ and can be acquired by detecting each finger's input coordinate for each finger's position and setting the input coordinates of 3 fingers into it when sensing touch of 3 fingers on the surface of the touch panel, after stating correction of images (presetting or changing correction mode will be explained in later part).

Preferably, set of coordinates Pn is changed, that is, n is increased if position of at least one finger is decided to be changed when movement of fingers is detected. In certain embodiment, however, it can be implemented to change the set of coordinates to new one only when movement of at least two fingers is detected by user's setup.

Center coordinates Cn is coordinates of a point $(CXn, CYn)$ which can be on inside or outside of triangle. One of center of gravity, inner center, excenter, circumcenter, orthocenter and so on of a triangle can be used by user's pre-setup, which can be calculated from coordinates of 3 points on a plane $(X1n, Y1n)$, $(X2n, Y2n)$, $(X3n, Y3n)$ using known mathematical method. Preferably, center of gravity can be used for a user to recognize it intuitively as a center of triangle.

In a preferred embodiment, in which initial center point of triangle can be setup to be fixed on interface when color correction works start, initial coordinates of C0 are preset, regardless of coordinates of initial points of fingers, and user start color correction work based on initial center point corresponding to the coordinates of C0.

Center deviation distance is a distance between current center coordinates of center point Cn and former center coordinates of center point Cn−1, and can be calculated using known mathematical method.

In a preferred embodiment, it can be a distance between current coordinates of center point Cn and coordinates of center point of the triangle formed by set of coordinates of initial points P0. In the preferred embodiment in which initial center point of triangle is fixed, it can be a distance between current coordinates of center point Cn and coordinates of initial center point corresponding to the fixed center point.

Triangle area size ratio is size ratio of areas between the area of current triangle formed by the current set of coordinates Pn of 3 points on a plane and the area of the former triangle formed by the former set of coordinates Pn−1 of 3 points on a plane, and can be calculated as ratio of the area of current triangle to the area of the former triangle or ratio of the area of the former triangle to the area of the current triangle.

In a preferred embodiment, it can be calculated as ratio of the area of current triangle to the area of the triangle formed by the initial set of coordinates of the initial point P0.

Average rotation value is a rotation ratio between the current triangle formed by the current set of coordinates of current points Pn and the former triangle formed by the former set of coordinates of former points Pn−1. It is desirable to realize so as to be set by users in various manners with which make the users intuitively experience the rotation of triangle and color correction effect resulting wherefrom, in accordance with user's preference and work style. For example, average ratio value of changes in degree of three angles between line of center coordinates of center point to coordinates of each point of triangle and horizontal line (X axis) or vertical line (Y axis) can be set as average rotation value. In addition, the ratio value of changes in degree of an angle which has biggest angle or the ratio value of changes in degree of a angle which has biggest change among the three angles can be set as average rotation value.

Also, as depicted in FIG. 4, since rotation degrees of lines of center coordinates of center point to coordinates of 3 points of triangle can has similar value in case that movement of center coordinates of center point or changes of area or shape of triangle is small, depending on user's preference and work style, the ratio value of changes in degree of an angle between a line of center coordinates of center point to coordinates of a random point can be set as average rotation value.

As depicted in FIG. 4, in case that rotation of triangle is mainly performed centered on a coordinates of a point among 3 points by user's preference and work style, preferably, rotation value of a point most distanced from the point, that is, ratio of change in degree of the angle between line of center coordinates of center point to coordinates of each point of triangle and horizontal line (X axis) or vertical line (Y axis) can be set as average rotation value.

Distance length ratios of distances from the center coordinates Cn to the set of coordinates Pn is defined as 3 ratios of 3 distances from the current center coordinates of center point Cn to the current set of coordinates of points Pn on a plane and corresponding 3 distances from the former center coordinates Cn−1 to the former set of coordinates of points Pn−1 on a plane, which can be calculated using known mathematical methods.

Vertical distance length ratios or horizontal distance length ratios of distances from the center coordinates Cn to the set of coordinates of points Pn is defined as 3 ratios of 3 vertical componential distances or 3 horizontal componential distances from the current center coordinates of center point Cn to the current set of coordinates of points Pn on a plane and corresponding 3 vertical componential distances or 3 horizontal componential distances 3 distances from the former center coordinates Cn−1 to the former set of coordinates of points Pn−1 on a plane, which can be calculated directly from set of coordinates of points or distances from the center coordinates to the set of coordinates of points using known mathematical methods.

Hereinafter, the ways how representative embodiments of method for correcting color of image using multi-touch capable touch-screen of the present invention will be engaged in color correction variables so as to be realized will be explained with reference to the accompanying drawings in the order of HSL method, RGB method, and BGC method.

(1) HSL Method

Hue, Saturation and Lightness method is most intuitive and common method in color correction methods since it is the one based on 3 characteristics of color. Considering that results from the change of values of RED, GREEN and BLUE and their relation is not be estimated easily in RGB method, technology of color correction using multi-touch can be said to be directly related to the efficiency in HSL method.

FIG. 5 to FIG. 8 are figures for explaining an embodiment when color correction methods of image according to an embodiment of the present invention are applied to the HSL method.

Figure 13:
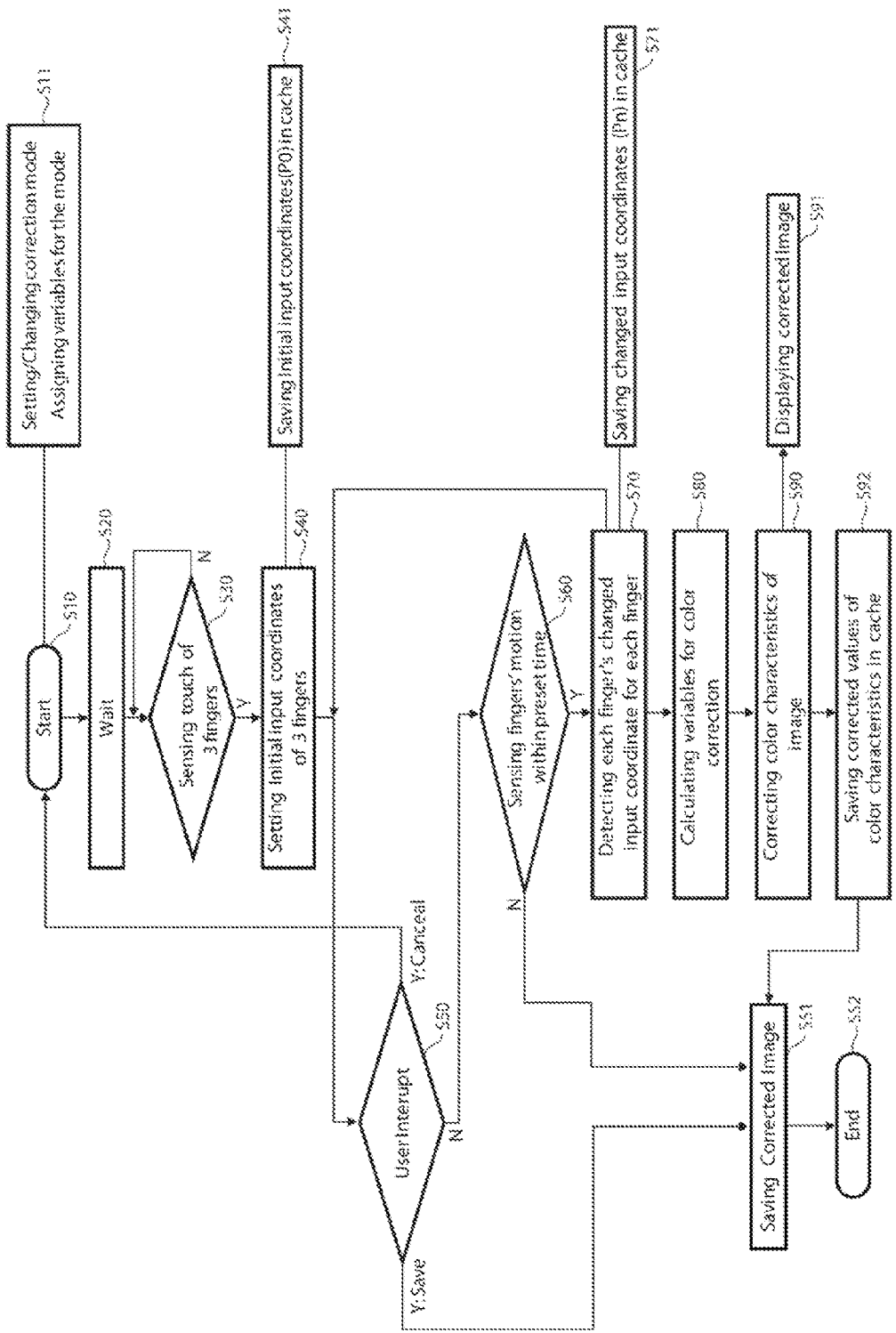
FIG. 13 is a flow chart showing the case when color correction methods of image according to an embodiment of the present invention are realized as user interface of computer device.

FIG. 13 is a flow chart showing the embodiment when color correction methods of image according to an embodiment of the present invention are realized as user interface of computer device with solutions comprised of software or hardware related with multi-touch capable touch-screen.

Figure 14:
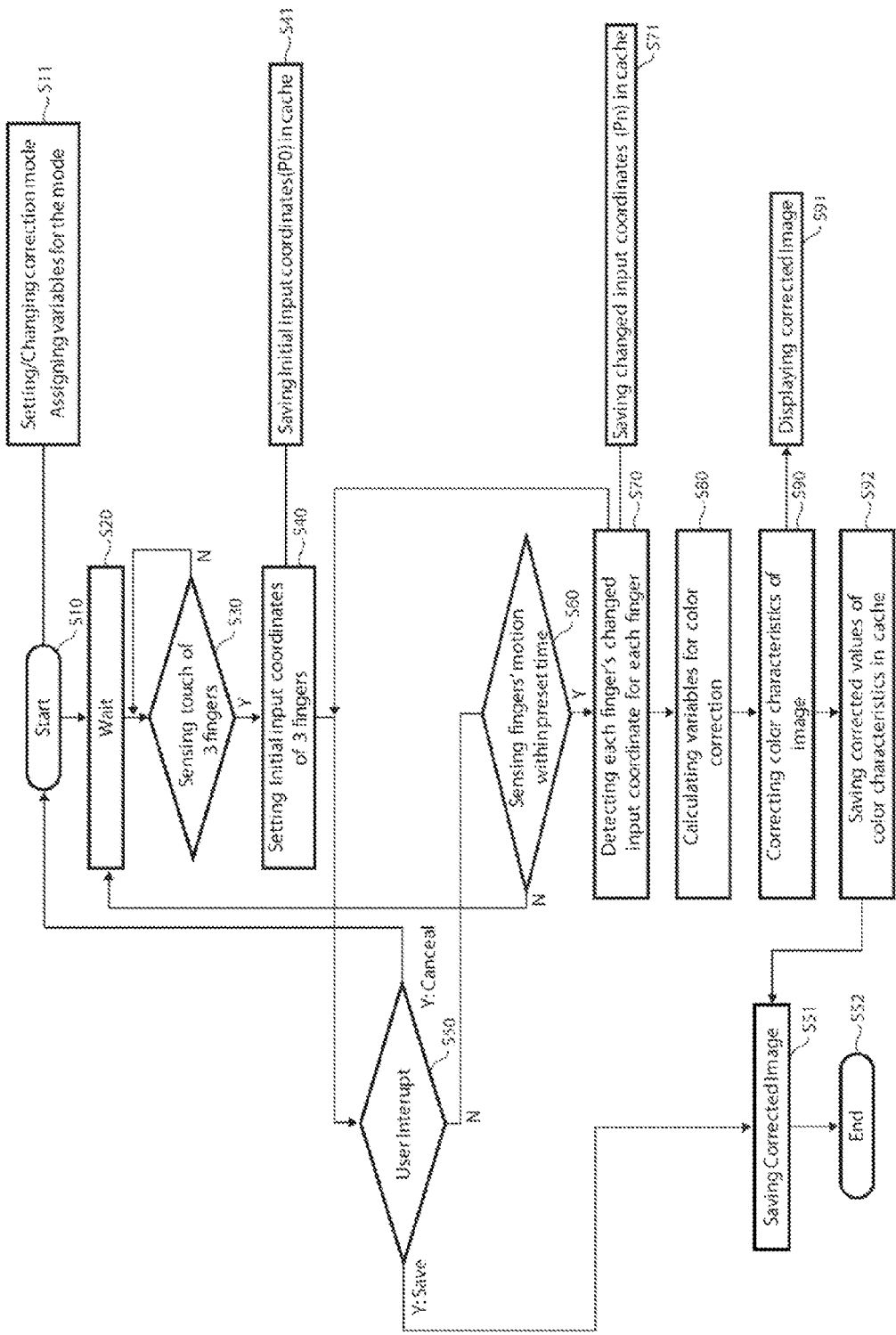
FIG. 14 is a flow chart showing modified embodiment of the embodiment in FIG. 13, which is realized to enter wait state when there is no movement of fingers within preset time.
Figure 16:
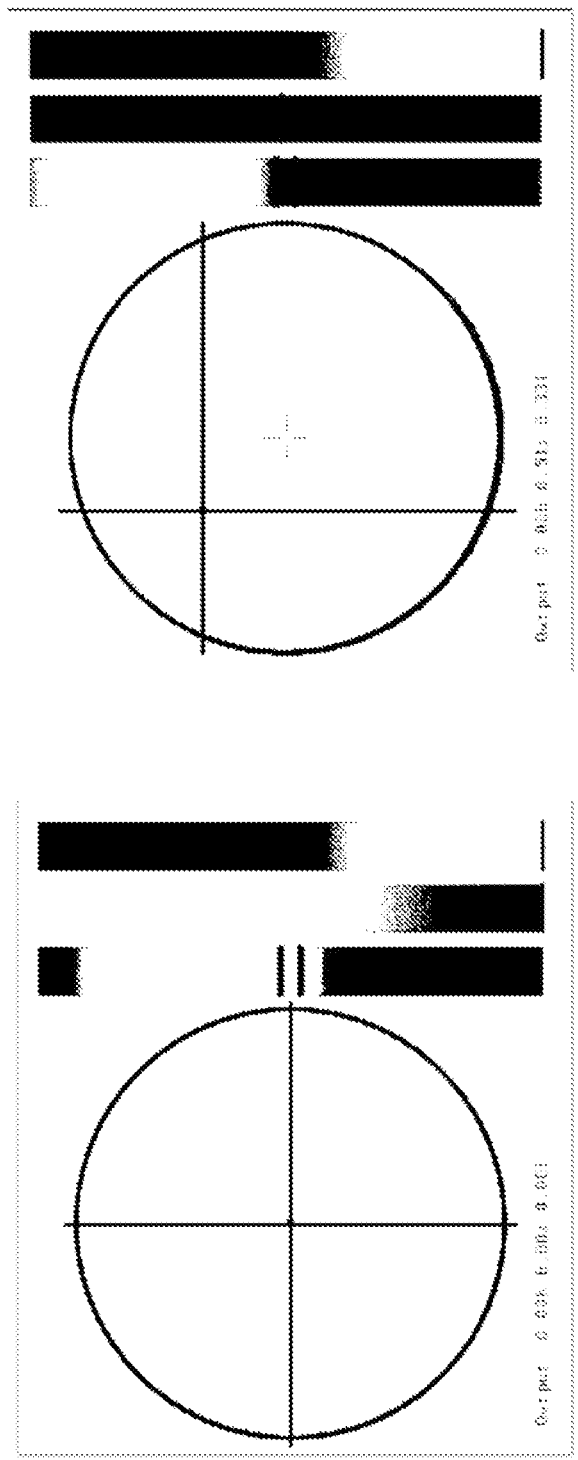
Figure 17:
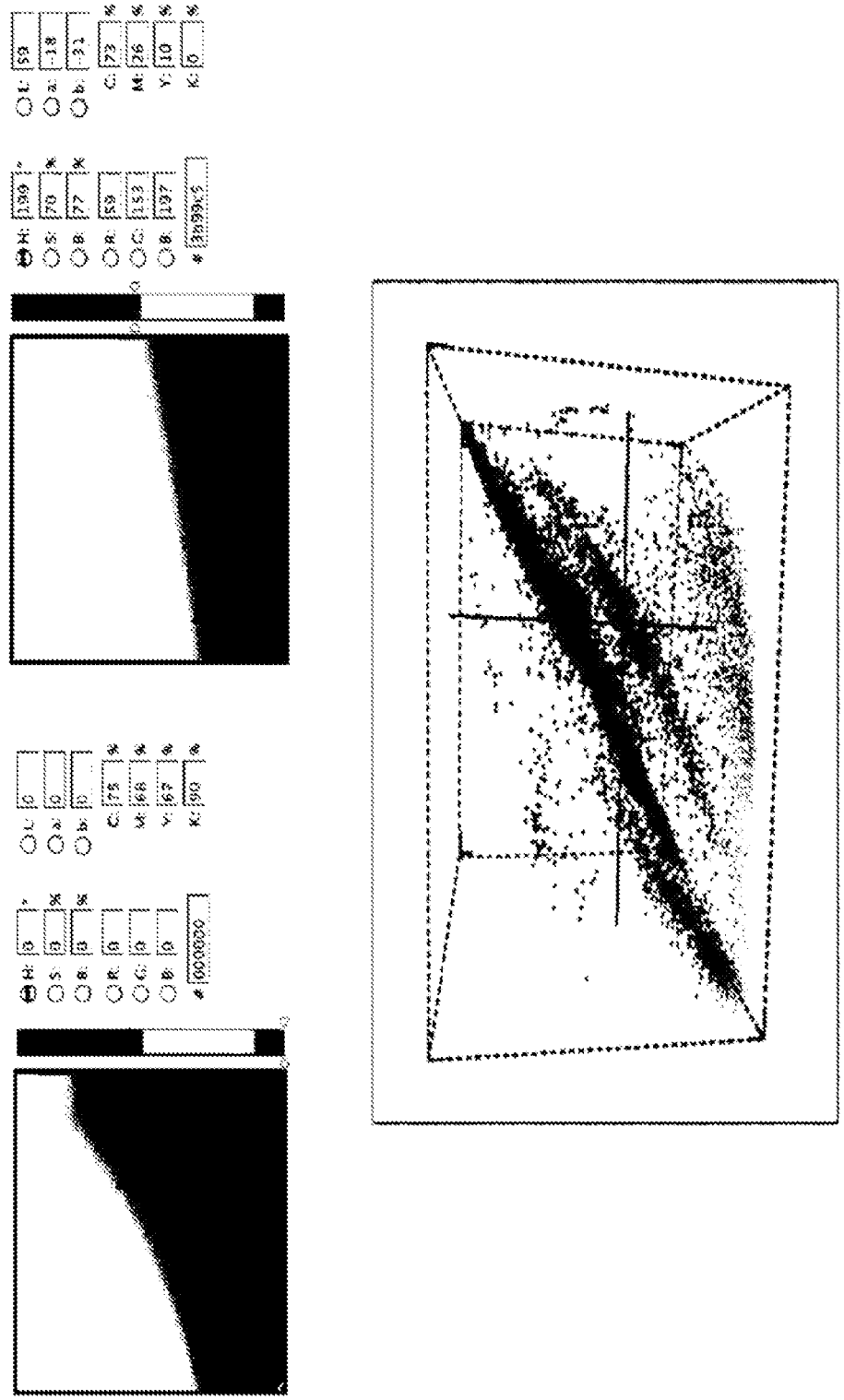
Figure 18:
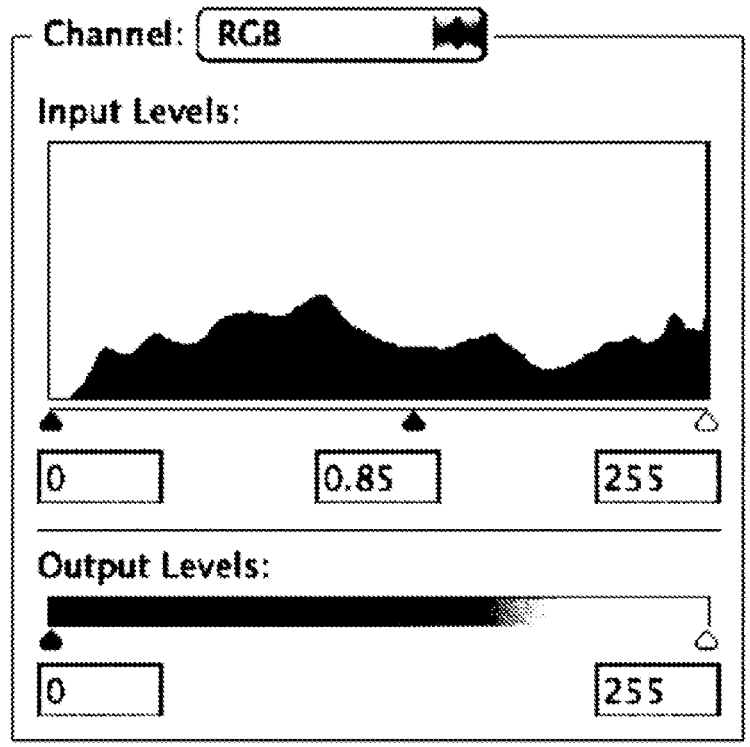
Figure 19:
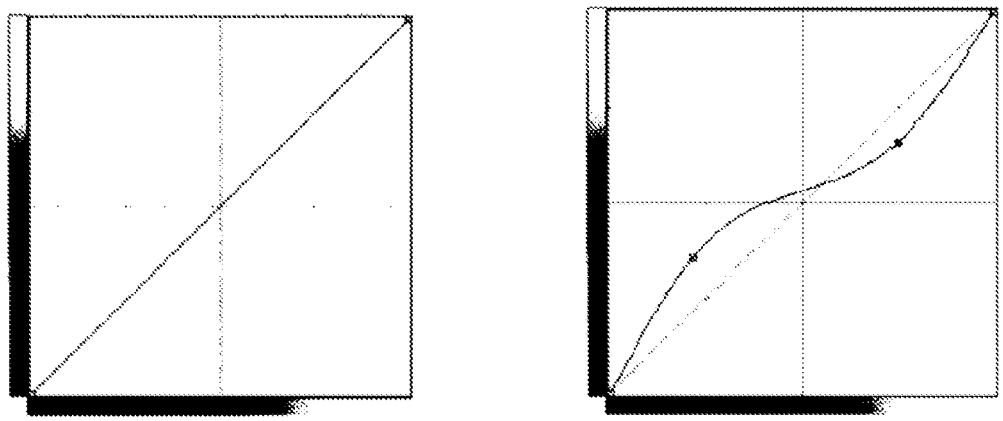
Figure 20:
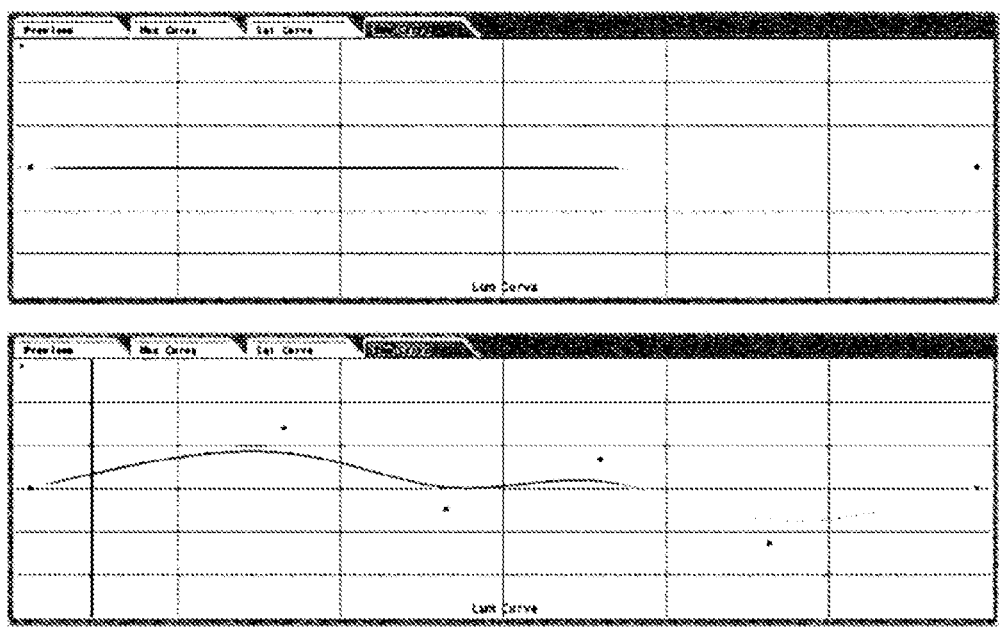
Figure 21:
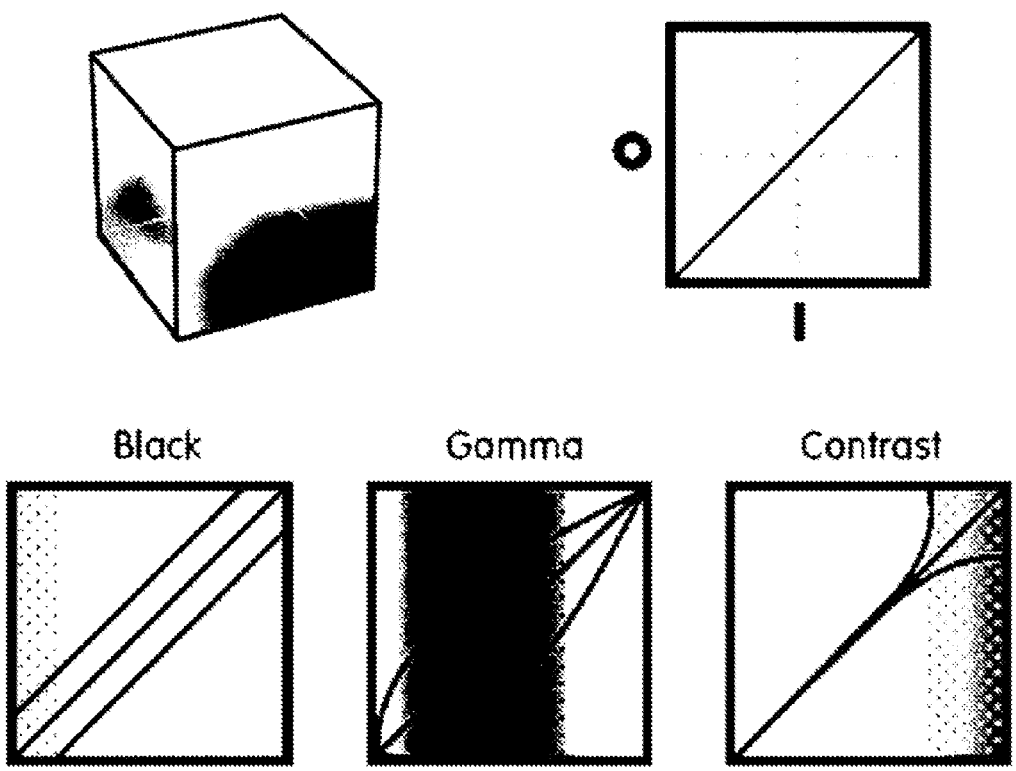

FIG. 14 is a flow chart showing modified embodiment of the embodiment in FIG. 13, which is realized to enter wait state (S20) when there is no movement of fingers within preset time.

It will be described in below with reference to the drawings.

Referring to FIG. 13 and FIG. 14, in the method for correcting color of image using multi-touch capable touch-screen, firstly, when a user selects one of correction modes, which is normally, one of HSL method, RGB method, and BGC method in start step (S10), variables for correction are assigned corresponding to the mode and the device wait until there is detection of touch of a finger or for preset time (S20). Through the step of sensing touch of 3 fingers (S30), the step (S40) of setting the input coordinates of 3 fingers into the initial set of coordinates is performed when touch of 3 fingers is detected of touch of a finger, and save the values of the initial set of coordinates in cache (S41).

Correction mode is possible to be realized in various ways which includes types that at least two of HSL method, RGB method, and BGC method are combined, types that one of the methods is partially combined to another method, and so on so as to be selected by users. And the embodiment is the case that HSL method is selected as a correction mode by mode setting.

Subsequently, deciding user interrupt as saving or concealing the correction work (S50), if there is no user interrupt, step (S60) of deciding whether there is movements of fingers within preset time is performed, and step (S70) of detecting each finger's changed input coordinates for each finger's changed position and setting the changed input coordinates of 3 fingers into the set of coordinates is performed when the movement of fingers are detected and values of the changed set of coordinates are saved in cache (S71). At the same time, using the values of current set of coordinates Pn, the values of former set of coordinates Pn−1 and center coordinates of respective centers Cn and Cn−1, variables for color correction is calculated (S80). In accordance with the variables, values of color characteristics of image are to be corrected (S90) and saved in cache, and corrected image is to be displayed on the screen (S91). As long as there is no user's interrupt, when there is detection of movement of user's finger within preset time, the process after the detecting each finger's changed input coordinates is continuing.

Figure 5:
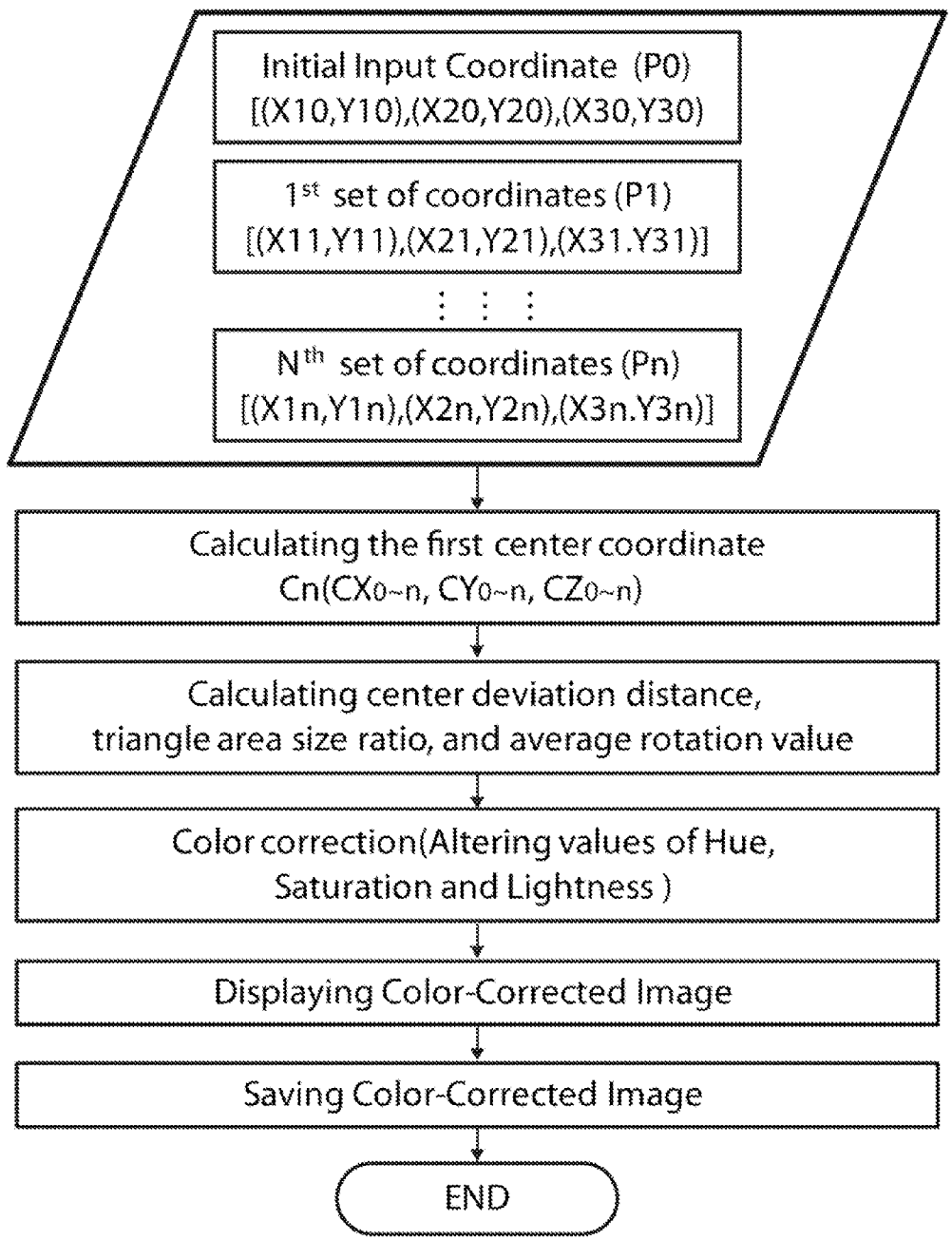

Referring to FIG. 5, a method for correcting color of image according to the embodiment is performed to applied to HSL method, which includes steps of sensing touch of 3 fingers on the surface of the touch panel, detecting each finger's input coordinate for each finger's position and setting the input coordinates of 3 fingers into the set of coordinates; calculating the center coordinate of the triangle formed by the set of coordinates; detecting each finger's changed input coordinate for each finger's changed position and setting the changed input coordinates of 3 fingers into the changed set of coordinates, according to the movement of the each finger on the touch panel; and calculating the changed center coordinate of the changed triangle formed by the changed set of coordinates.

Basic data for calculating variables of center deviation distance, the triangle area size ratio and average rotation value for color correction on which values of Hue, Saturation and Lightness of the image is altered based is acquired by performing the steps, which are the set of coordinates of current points Pn which varies according to the movement of the each finger, center coordinates for current center point Cn which is calculated using it, the set of coordinates of former points Pn−1 (saved in cache) and center coordinates for former center point Cn−1 which is calculated using it.

Center deviation distance, the triangle area size ratio and average rotation value for color correction of the HSL method are calculated and acquired based on basic data by performing the steps of calculating the center deviation distance between the former center coordinate and the current center coordinate; calculating triangle area size ratio between the area of former triangle and the area of the current triangle; and calculating average rotation value between the former triangle and current triangle.

Color correction is performed by altering values of Hue, Saturation and Lightness of the image based on the center deviation distance, the triangle area size ratio and average rotation value which are variables for color correcting and acquired by the above process in accordance with user's setup.

Preferably, it can be performed to display the image which is being corrected for user to confirm it on the display, and realized to save the corrected image and put to end the process by the preset condition as well as by user's choice.

In above embodiment, it is more preferable that which variables of center deviation distance, the triangle area size ratio and average rotation value for color correction are to be assigned to values of Hue, Saturation and Lightness of the image is decided by users in mode setting above explained.

Figure 6:
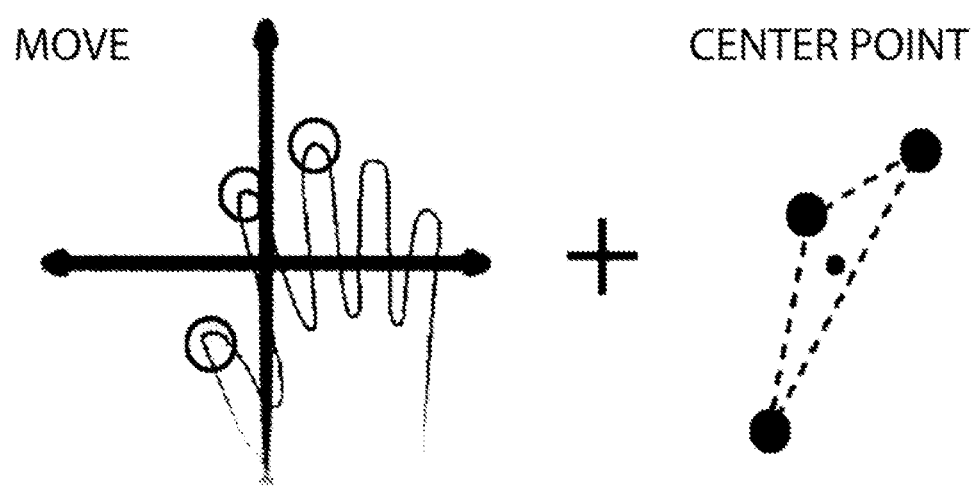

In another embodiment referring to FIG. 6 to FIG. 8, it is preferable that the hue of the image is altered in proportion to the center deviation distance between the first center coordinate and the second center coordinate, the saturation of the image is altered in proportion to the triangle area size ratio of the area of the second triangle to the area of first triangle, and lightness of the image is altered in proportion to average rotation value between the first triangle and the second triangle. And, preferably the center of triangle or center coordinates is set to be center of gravity of triangle.

If implementation of extracting the Hue value is realized by using behavior of Movement of the natural hand method and principle of central point of weight in manipulating color (Hue) and extracting the changed value, the color (Hue) element means the color defined as the direction (bearing) when viewed from the perspective of the oriental Yin-Yang and Five Elements. In the color spectrum and color wheel, the colors imply the direction. Eventually, in proportional to the changed distance of center between the location coordinates to reflect the movement of hands in Natural Hand method, changing the color values of the image is the behavior that the color (Hue) elements has the original meaning Also, seeing the dictionary meaning of the Saturation, Saturation manipulation and extraction of the changed value show how well the color sits. It is not easy to understand, but it is easier to understand to explain whether the color is turbid or pure, or the color is flocculated or deflocculated.

Saturation value is determined according to the distance from the central white Point in the actual CIE xy standard color space. Considering flocculation/deflocculation or the distance from the center point, the following acts in natural hand method could easily evoke. The area of a triangle created by input data with the 3-finger based on the behavior of Contraction/Expansion is determined, it is desirable to implement a change to the value of the saturation of the image is proportional to the ratio of the area of the triangle.

Furthermore, Brightness (Lightness)) operations and extraction of the changed value is the Lightness (Brightness)) which is the last element of HSL method. The color is the result made from the wavelength of the light, as is well known. The life of alight is the brightness, thus it can be inferred that the brightness shows the vitality of the color.

When we think of the increase and decrease of vitality, we are reminiscent of the nob. Turning something such as locking and opening a faucet, or increasing or decreasing the audio sound is to control the driving force thereof. The same principle is used in the natural hand method.

Because the behavior of Rotation is done in order to control the brightness (Lightness)) elements representing the vitality of the color, it is desirable to change brightness (Lightness)) values of the image in proportion to the average rotational value to adjust the lightness (Lightness)) elements in the HSL method.

(2) RGB Method

Figure 9:
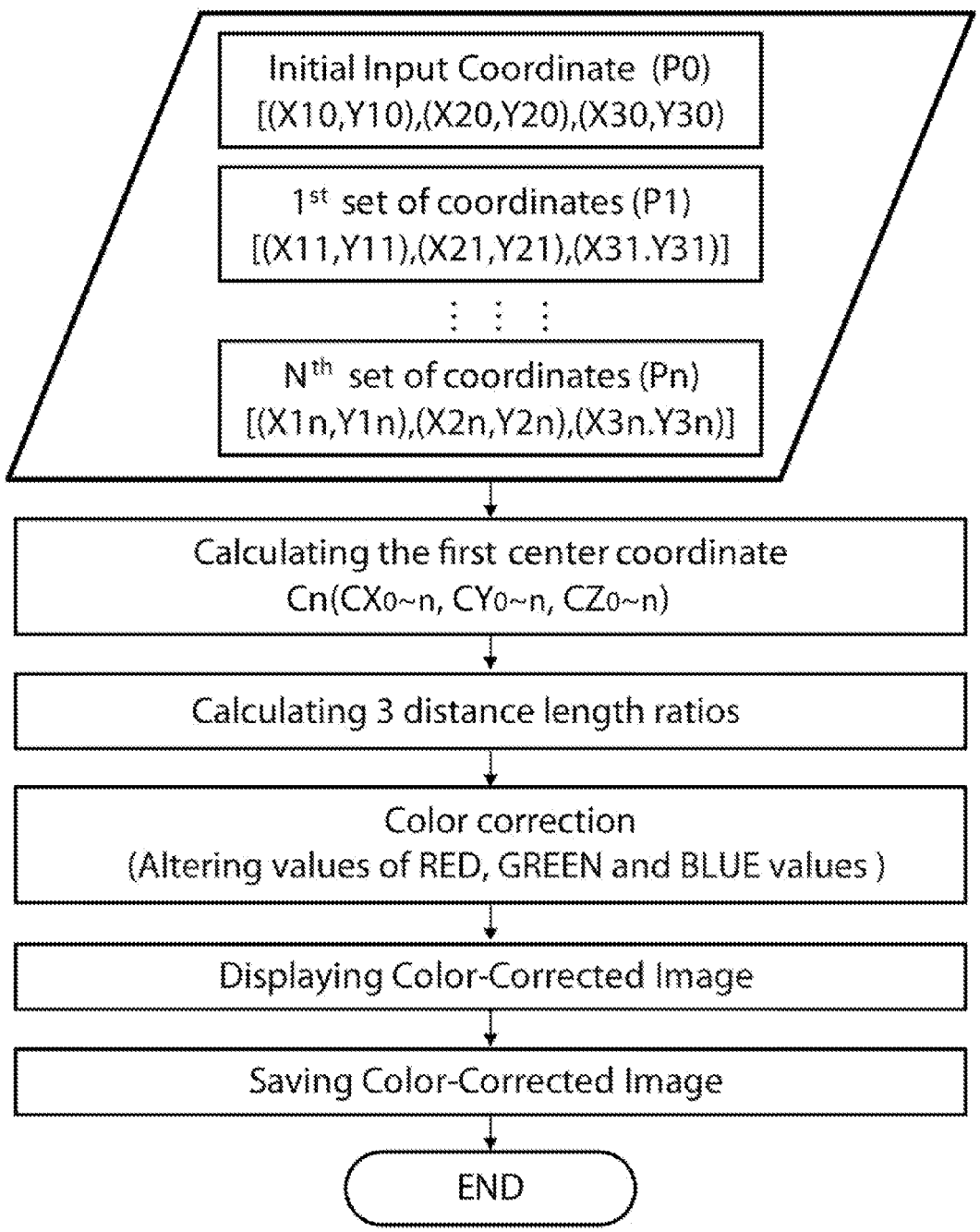
FIG. 9 and FIG. 10 are figures for explaining an embodiment when color correction methods of image according to an embodiment of the present invention are applied to the RGB method.
Figure 10:
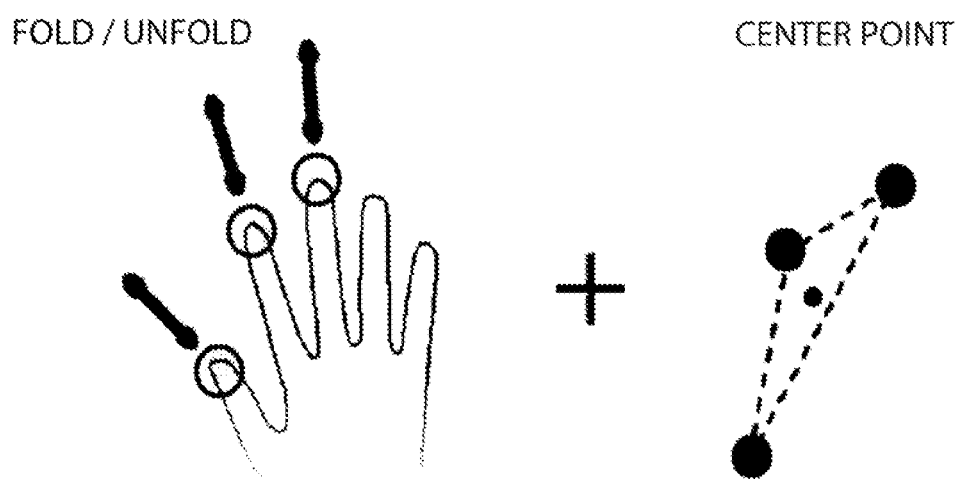

FIG. 9 and FIG. 10 are figures for explaining an embodiment when color correction methods of image according to an embodiment of the present invention are applied to the RGB method.

Hereinafter, the embodiments will be described with reference to FIG. 9, FIG. 10, FIG. 13, and FIG. 14.

Referring to FIG. 13 and FIG. 14, in the method for correcting color of image using multi-touch capable touchscreen, firstly, when a user selects one of correction modes, which is normally one of HSL method, RGB method, and BGC method in start step (S10), variables for correction are assigned corresponding to the mode and the device wait until there is detection of touch of a finger or for preset time (S20). Through the step (S30) of sensing touch of 3 fingers, the step (S40) of setting the input coordinates of 3 fingers into the initial set of coordinates is performed when touch of 3 fingers is detected of touch of a finger, and save the values of the initial set of coordinates in cache (S41).

Setting the correction mode is possible to be realized in various ways which includes types that at least two of HSL method, RGB method, and BGC method are combined, types that one of the methods is partially combined to another method, and so on so as to be selected by users. And the embodiment is the case that RGB method is selected as one correction mode by mode setting.

Referring to FIG. 9 and FIG. 10, a method for correcting color of image according to the embodiment is performed to applied to RGB method, which includes steps of sensing touch of 3 fingers on the surface of the touch panel, detecting each finger's input coordinate for each finger's position and setting the input coordinates of 3 fingers into the set of coordinates; calculating the center coordinate of the triangle formed by the set of coordinates; detecting each finger's changed input coordinate for each finger's changed position and setting the changed input coordinates of 3 fingers into the changed set of coordinates, according to the movement of the each finger on the touch panel; and calculating the changed center coordinate of the changed triangle formed by the changed set of coordinates.

Basic data for color correction which values of Red, Green and Blue of the image is altered based on is acquired, which are the set of coordinates of current points Pn which varies according to the movement of the each finger, center coordinates for current center point Cn which is calculated using it, the set of coordinates of former points Pn−1 (saved in cache) and center coordinates for former center point Cn−1 which is calculated using it, by performing the steps.

3 distances from the center to set of coordinates of the points for 3 fingers in current time and former time is to be calculated and 3 distance length ratios of the current set of distances to the former set of distances are calculated and acquired as variables for color correction of the RGB method, by performing the steps of calculating the former set of distances from the former center coordinate to the former set of coordinates and calculating the current set of distances from the current center coordinate to the current set of coordinates.

Color correction is performed by altering values of Red, Green and Blue of the image based on variables acquired by the above process in accordance with user's setup. Preferably, it can be performed to display the image which is being corrected for user to confirm it on the display, and realized to save the corrected image and put to end the process by the preset condition as well as by user's choice.

In above embodiment, it is more preferable that which distance ratio are to be assigned to values of Red, Green and Blue of the image is decided by users in mode setting as mentioned above.

(3) BGC Method

Figure 11:
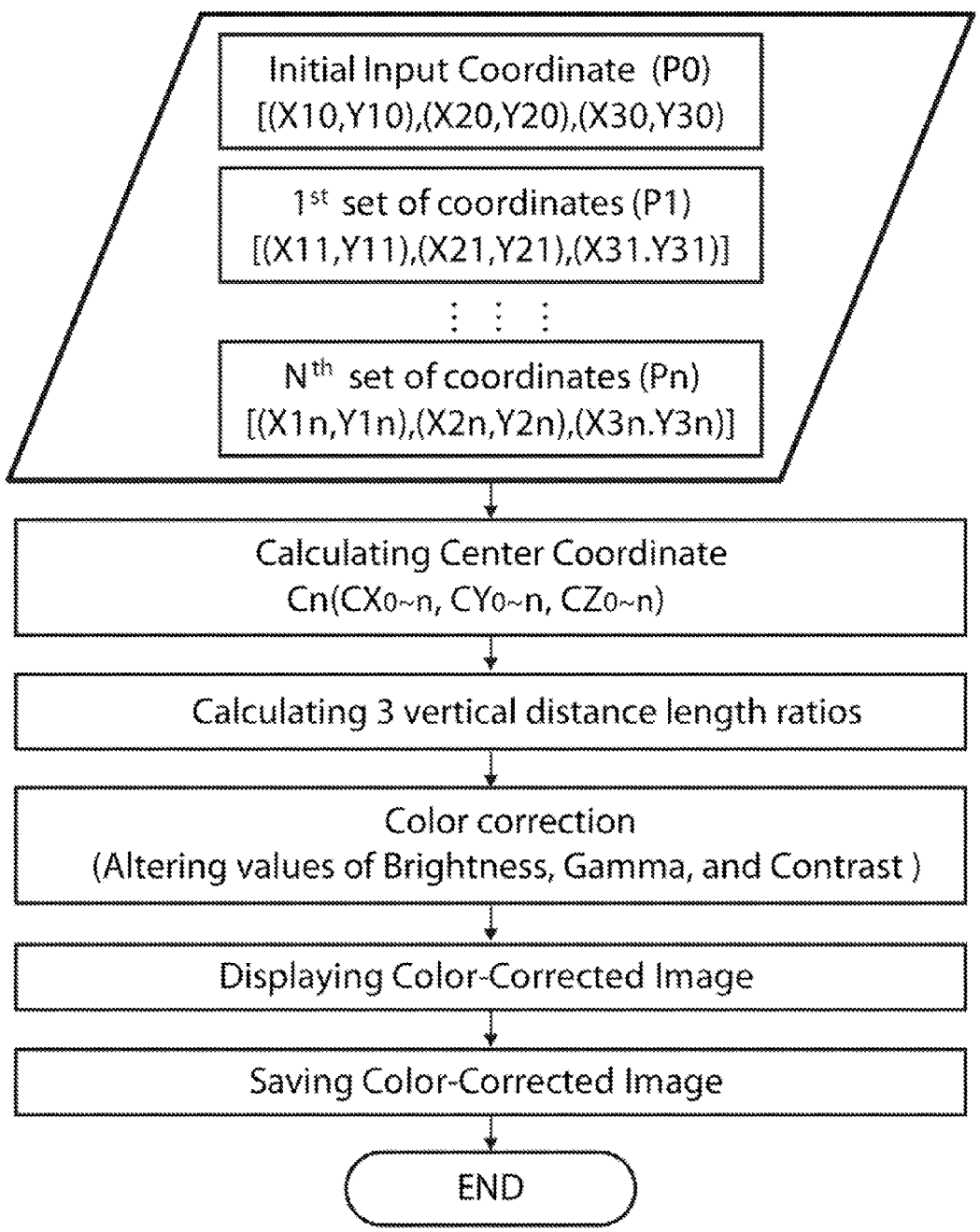
FIG. 11 and FIG. 12 are figures for explaining an embodiment when color correction methods of image according to an embodiment of the present invention are applied to the BGC method.
Figure 12:
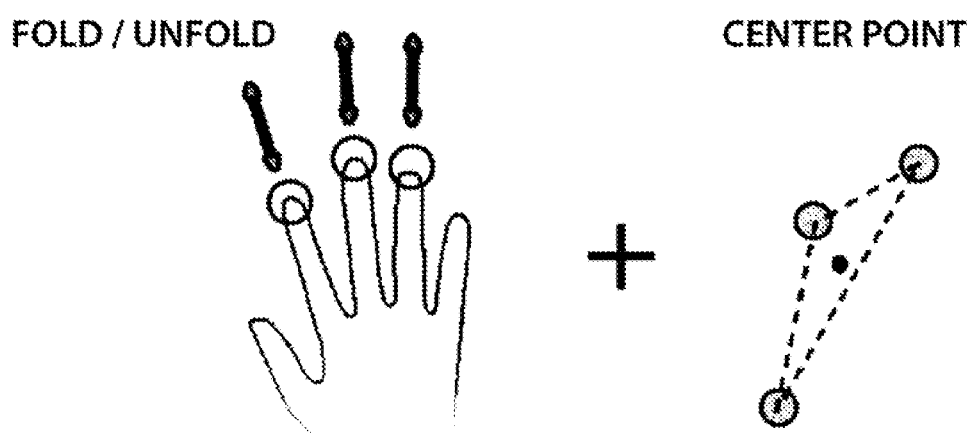

FIG. 11 and FIG. 12 are figures for explaining an embodiment when color correction methods of image according to an embodiment of the present invention are applied to the BGC method.

Hereinafter, the embodiments will be described with reference to FIG. 11, FIG. 12, FIG. 13, and FIG. 14.

Referring to FIG. 13 and FIG. 14, in the method for correcting color of image using multi-touch capable touchscreen, firstly, when a user selects one of correction modes, which is normally, one of HSL method, RGB method, and BGC method in start step (S10), variables for correction are assigned corresponding to the mode and the device wait until there is detection of touch of a finger or for preset time (S20). Through the step of sensing touch of 3 fingers (S30), the step (S40) of setting the input coordinates of 3 fingers into the initial set of coordinates is performed when touch of 3 fingers is detected of touch of a finger, and save the values of the initial set of coordinates in cache (S41).

Setting the correction mode is possible to be realized in various ways which includes types that at least two of HSL method, RGB method, and BGC method are combined, types that one of the methods is partially combined to another method, and so on so as to be selected by users. And the embodiment is the case that BGC method is selected as one correction mode by mode setting.

Referring to FIG. 11 and FIG. 12, a method for correcting color of image according to the embodiment is performed to applied to RGB method, which includes steps of sensing touch of 3 fingers on the surface of the touch panel, detecting each finger's input coordinate for each finger's position and setting the input coordinates of 3 fingers into the set of coordinates; calculating the center coordinate of the triangle formed by the set of coordinates; detecting each finger's changed input coordinate for each finger's changed position and setting the changed input coordinates of 3 fingers into the changed set of coordinates, according to the movement of the each finger on the touch panel; and calculating the changed center coordinate of the changed triangle formed by the changed set of coordinates.

Basic data for color correction which values of Brightness, Gamma and Contrast of the image is altered based on is acquired, which are the set of coordinates of current points Pn which varies according to the movement of the each finger, center coordinates for current center point Cn which is calculated using it, the set of coordinates of former points Pn−1 (saved in cache) and center coordinates for former center point Cn−1 which is calculated using it, by performing the steps.

3 vertical componential distances from the center to set of coordinates of the points for 3 fingers in current time and former time are to be calculated, and 3 vertical distance length ratios of the current set of vertical componential distances to the former set of vertical componential distances are calculated and acquired as variables for color correction of the BCG method, by performing the steps of calculating the former set of vertical componential distances from the former center coordinate to the former set of coordinates and calculating the current set of vertical componential distances from the current center coordinate to the current set of coordinates.

Color correction can be performed by altering values of Brightness, Gamma and Contrast of the image based on variables acquired by the above process in accordance with user's setup. In above embodiment, it is more preferable that which distance ratio are to be assigned to values of Brightness, Gamma and Contrast of the image is decided by users in mode setting as mentioned above.

(4) Combinational Method

The embodiments of the present invention are not limited to the type of choosing one method among HSL method, RGB method, and BGC method.

Accordingly, it is possible to realize in various ways which includes types that at least two of HSL method, RGB method, and BGC method are combined, types that one of the methods is partially combined to another method, and so on so as to be selected by users. Surely, various customized combination types can be provided with users as preset modes.

For example, it can be realized to combine the steps of calculating the former set of distances from the former center coordinate to the former set of coordinates and calculating the current set of distances from the current center coordinate to the current set of coordinates to HSL method aforementioned and values of RED, GREEN and BLUE of the image is altered in proportion to the 3 distance length ratios of the current set of distances to the former set of distances, which can be a type of full combination of HSL method and RGB method.

Also, it can be realized to combine the steps of calculating the former set of vertical or horizontal componential distances from the former center coordinate to the former set of coordinates and calculating the current set of vertical or horizontal componential distances from the current center coordinate to the current set of coordinates to HSL method aforementioned, and values of Brightness, Gamma, and Contrast of the image is altered in proportion to the 3 vertical or horizontal distance length ratios of the current set of distances to the former set of distances, which can be a type of full combination of HSL method and BGC method.

In addition, for example of partial combination in which part of one method combined to another, by combining one or two of the steps of calculating the center deviation distance between the former center coordinate and the current center coordinate, calculating triangle area size ratio between the area of former triangle and the area of the current triangle, and calculating average rotation value between the former triangle and current triangle and one or two of Hue, Saturation and Lightness of the image is altered based on one or two of the center deviation distance, the triangle area size ratio and average rotation value, type of combination of RGB method and a part of HSL method can be realized.

IMPLEMENTATION FOR INVENTION

The examples in the case of combining these three methods of are shown in the table of FIG. 23.

Table 23 summarizes the color correction method and multi-touch method according to an area-specific mode. It is possible to complexly use 1, 2 and 3 multi-touch method in different modes depending on each case.

As above described, the present invention is described according to an embodiment with reference to the embodiment shown in the drawings. However, these are exemplary and the scope of the rights of the present invention is not limited to these. The scope of the rights of the present invention is defined by matters entered in the claims containing various modifications and embodiments with equivalent range.

The invention claimed is:

1. A method for correcting the color of an image using a multi-touch capable touch-screen, the method comprising:
sensing touch of three fingers on the surface of the touch panel, detecting each finger's input coordinates for each finger's position and setting the input coordinates of three fingers into a first set of coordinates;
calculating the first center coordinates of the first triangle formed by the first set of coordinates;
detecting each finger's changed input coordinate for each finger's changed position and setting the changed input coordinates of three fingers into a second set of coordinates, according to the movement of the each finger on the touch panel;
calculating the second center coordinate of a second triangle formed by the second set of coordinates;
calculating the center deviation distance between the first center coordinate and the second center coordinate;
calculating triangle area size ratio between the area of first triangle formed by the first set of coordinates and the area of the second triangle formed by the second set of coordinates; and
calculating average rotation value between the first triangle formed by the first set of coordinates and the second triangle formed by the second set of coordinates, wherein, Hue, Saturation and lightness of the image is altered based on the center deviation distance, the triangle area size ratio and average rotation value.

2. The method of claim 1, wherein
the hue of the image is altered in proportion to the center deviation distance between the first center coordinate and the second center coordinate, the saturation of the image is altered in proportion to the triangle area size ratio of the area of the second triangle to the area of the first triangle, and the lightness of the image is altered in proportion to the average rotation value between the first triangle and the second triangle.

3. The method of claim 1, further comprising
calculating the first set of distances from the first center coordinate to the first set of coordinates, and calculating the second set of distances from the second center coordinate to the second set of coordinates, wherein, at least one of values of RED, GREEN and BLUE of the image is altered in proportion to at least one of the three distance length ratios of the second set of distances to the first set of distances.

4. The method of claim 1, further comprising
calculating the first set of vertical distances that are vertical component distances of the first set of distances from the first center coordinate to the first set of coordinates, and the second set of vertical distances that are vertical component distances of the second set of distances from the second center coordinate to the second set of coordinates, wherein, values of Brightness, Gamma, and Contrast of the image are altered in proportion to the three distance length ratios of the second set of distances to the first set of distances.

5. The method of claim 1, further comprising
calculating the first set of horizontal distances that are horizontal component distances of the first set of distances from the first center coordinate to the first set of coordinates, and the second set of horizontal distances that are horizontal component distances of the second set of distances from the second center coordinate to the second set of coordinates, wherein, values of Brightness, Gamma, and Contrast of the image are altered in proportion to the three distance length ratios of the second set of distances to the first set of distances.

6. A method for correcting the color of an image using a multi-touch capable touch-screen, the method comprising:
sensing touch of three fingers on the surface of the touch panel, detecting each finger's input coordinate for each finger's position and setting the input coordinates of three fingers into a first set of coordinates;
calculating the first center coordinate of a first triangle formed by the first set of coordinates;
detecting each finger's changed input coordinate for each finger's changed position and setting the changed input coordinates of three fingers into a second set of coordinates, according to the movement of the each finger on the touch panel;
calculating the second center coordinate of a second triangle formed by the second set of coordinates;
calculating the first set of distances from the first center coordinate to the first set of coordinates;
calculating the second set of distances from the second center coordinate to the second set of coordinates, wherein, RED, GREEN and BLUE of the image are altered in proportion to distance length ratios of the second set of distances to the first set of distances.

7. The method of claim 6, further comprising
calculating the center deviation distance between the first center coordinate and the second center coordinate, wherein, one of Hue, Saturation and Lightness of the image is altered in proportion to the center deviation distance.

8. The method of claim 6, further comprising
calculating the triangle area size ratio between the area of first triangle formed by the first set of coordinates and the area of the second triangle formed by the second set of coordinates, wherein, one of Hue, Saturation and Lightness of the image is altered in proportion to the triangle area size ratio.

9. The method of claim 6, further comprising
calculating the average rotation value between the first triangle formed by the first set of coordinates and the second triangle thrilled by the second set of coordinates, wherein, one of Hue, Saturation and Lightness of the image is altered in proportion to the average rotation value.

10. The method of claim 6, further comprising
calculating the first set of vertical distances that are vertical component distances of the first set of distances from the first center coordinate to the first set of coordinates, and the second set of vertical distances that are vertical component distances of the second set of distances from the second center coordinate to the second set of coordinates, wherein, values of Brightness, Gamma, and Contrast of the image are altered in proportion to the three distance length ratios of the second set of distances to the first set of distances.

11. The method of claim 6, further comprising
calculating the first set of horizontal distances that are horizontal component distances of the first set of distances from the first center coordinate to the first set of coordinates, and the second set of horizontal distances that are horizontal component distances of the second set of distances from the second center coordinate to the second set of coordinates, wherein, values of Brightness, Gamma, and Contrast of the image are altered in proportion to the three distance length ratios of the second set of distances to the first set of distances.

12. A method for correcting the color of an image using a multi-touch capable touch-screen, the method comprising;
sensing touch of three fingers on the surface of the touch panel, detecting each finger's input coordinate for each fingers position and setting the input coordinates of three fingers into a first set of coordinates;
calculating the first center coordinate of a first triangle formed by the first set of coordinates;
detecting each finger's changed input coordinate for each finger's changed position and setting the changed input coordinates of three fingers into a second set of coordinates, according to the movement of the each finger on the touch panel;
calculating the second center coordinate of a second triangle formed by the second set of coordinates;
calculating the first set of vertical distances that are vertical component distances of the first set of distances from the first center coordinate to the first set of coordinates, and the second set of vertical distances that are vertical component distances of the second set of distances from the second center coordinate to the second set of coordinates,
wherein, values of Brightness, Gamma, and Contrast of the image are altered in proportion to the three vertical distance length ratios of the second set of distances to the first set of distances.

13. A method for correcting the color of an image using a multi-touch capable touch-screen, the method comprising:
sensing touch of three fingers on the surface of the touch panel, detecting each finger's input coordinate for each finger's position and setting the input coordinates of three fingers into a first set of coordinates;
calculating the first center coordinate of a first triangle formed by the first set of coordinates;
detecting each finger's changed input coordinate for each finger's changed position and setting the changed input coordinates of three fingers into a second set of coordinates, according to the movement of the each finger on the touch panel;
calculating the second center coordinate of a second triangle formed by the second set of coordinates; and
calculating the first set of horizontal distances that are horizontal component distances of the first set of distances from the first center coordinate to the first set of coordinates, and the second set of horizontal distances that are horizontal component distances of the second set of distances from the second center coordinate to the second set of coordinates, wherein, values of Brightness, Gamma, and Contrast of the image are altered in proportion to the three distance length ratios of the second set of distances to the first set of distances.

14. The method of claim 12 or 13, further comprising
calculating the center deviation distance between the first center coordinate and the second center coordinate, wherein, one of Hue, Saturation and Lightness of the image is altered in proportion to the center deviation distance.

15. The method of claim 12 or 13, further comprising
calculating the triangle area size ratio between the area of the first triangle formed by the first set of coordinates and the area of the second triangle formed by the second set of coordinates, wherein, one of Hue, Saturation and Lightness of the image is altered in proportion to the triangle area size ratio.

16. The method of claim 12 or 13, further comprising
calculating the average rotation value between the first triangle formed by the first set of coordinates and the second triangle formed by the second set of coordinates, wherein, one of Hue, Saturation and Lightness of the image is altered in proportion to the average rotation value.

\* \* \* \* \*